(12) United States Patent
Schneider et al.

(10) Patent No.: US 8,573,172 B2
(45) Date of Patent: Nov. 5, 2013

(54) CAMSHAFT

(75) Inventors: Falk Schneider, Korntal-Münchingen (DE); Thomas Flender, Eberdingen (DE); Michael Kreisig, Stuttgart (DE)

(73) Assignee: Mahle International GmbH (DE)

( * ) Notice: Subject to any disclaimer, the term of this patent is extended or adjusted under 35 U.S.C. 154(b) by 32 days.

(21) Appl. No.: 13/202,258

(22) PCT Filed: Feb. 10, 2010

(86) PCT No.: PCT/EP2010/051614
§ 371 (c)(1),
(2), (4) Date: Oct. 31, 2011

(87) PCT Pub. No.: WO2010/094601
PCT Pub. Date: Aug. 26, 2010

(65) Prior Publication Data
US 2012/0037103 A1    Feb. 16, 2012

(30) Foreign Application Priority Data
Feb. 19, 2009   (DE) .......................... 10 2009 009 664

(51) Int. Cl.
*F01L 3/10*   (2006.01)
*F01L 1/14*   (2006.01)

(52) U.S. Cl.
USPC ..................................... 123/90.67; 123/90.57

(58) Field of Classification Search
USPC ................ 123/90.1–90.67; 29/888.1; 82/173; 206/524.7, 318
See application file for complete search history.

(56) References Cited

U.S. PATENT DOCUMENTS

| | | | |
|---|---|---|---|
| 4,667,969 A * | 5/1987 | Suggs, III ..................... | 277/537 |
| 4,821,693 A | 4/1989 | Koller | |
| 5,392,511 A * | 2/1995 | Copeland et al. ............ | 29/888.1 |
| 5,501,469 A * | 3/1996 | Ducugnon et al. ............ | 277/551 |
| 6,171,070 B1 * | 1/2001 | Mitake ......................... | 417/273 |
| 7,802,549 B2 * | 9/2010 | Schneider .................... | 123/90.6 |
| 2008/0181549 A1 | 7/2008 | Nakano et al. | |
| 2008/0289592 A1 * | 11/2008 | Flender et al. ............... | 123/90.6 |
| 2009/0223049 A1 * | 9/2009 | Binder et al. ................. | 29/888.1 |

FOREIGN PATENT DOCUMENTS

| | | |
|---|---|---|
| DE | 3445715 A1 | 6/1986 |
| DE | 3643673 A1 | 6/1988 |
| DE | 19844203 A1 | 3/2000 |
| DE | 102005020236 A1 | 11/2006 |
| DE | 102007024092 A1 | 11/2008 |
| EP | 1860336 A1 | 11/2007 |
| EP | 1995471 A2 | 11/2008 |
| WO | WO-2004067999 A1 | 8/2004 |

OTHER PUBLICATIONS

English abstract for EP-1995471, Nov. 26, 2008.
English abstract for DE-102005020236, Nov. 9, 2006.
English abstract for DE-19844203, Mar. 30, 2000.
English abstract for DE-3445715, Jun. 19, 1986.

\* cited by examiner

*Primary Examiner* — Kenneth Bomberg
*Assistant Examiner* — Deming Wan
(74) *Attorney, Agent, or Firm* — Rader, Fishman & Grauer PLLC

(57) ABSTRACT

A camshaft transport securing mechanism for an internal combustion engine. The camshaft having at least one transport securing mechanism, the transport securing mechanism axially fixing at least one bearing, wherein the transport securing mechanism is one of released by wear or disintegration during operation of the internal combustion engine.

8 Claims, 1 Drawing Sheet

＃ CAMSHAFT

CROSS-REFERENCES TO RELATED APPLICATIONS

This application claims priority to German patent application 10 2009 009 664.7 filed on Feb. 19, 2009 and PCT patent application PCT/EP2010/051614 filed on Feb. 10, 2010, which are hereby incorporated by reference in their entirety.

TECHNICAL FIELD

The present invention relates to a camshaft of an internal combustion engine, comprising at least one transport securing mechanism. The invention also relates to an internal combustion engine equipped with such a camshaft.

BACKGROUND

Camshafts in internal combustion engines are well known and serve for controlling the opening times of intake and exhaust valves. Mounting a camshaft in a cylinder head of an internal combustion engine is often relatively complicated because the camshaft has to be aligned prior to assembly. The effort for aligning can be reduced, for example, in that for delivering the camshaft to an assembly location, transport securing mechanisms are used which, however, generally have the disadvantage that they have to be removed again after assembling the camshaft in the cylinder head of the internal combustion engine so as to be able to ensure a proper operation of the camshaft in the internal combustion engine.

SUMMARY

The present invention is concerned with the problem of providing an improved embodiment for a camshaft by means of which in particular mounting such a camshaft in an associated internal combustion engine is simplified.

This problem is solved according to the invention by the subject matters of the independent claims. Advantageous embodiments are subject matter of the dependent claims.

The present invention is based on the general idea to use a transport securing mechanism for transporting a camshaft, which transport securing mechanism does not have to be removed after assembling the camshaft in an internal combustion engine but can remain on the camshaft and, for example, wears out during the run-in phase of the internal combustion engine or disintegrates due to a chemical reaction thereby achieving a release. In contrast to conventional transport securing mechanisms which have to be removed in a complicated and thus costly manner after assembling the camshaft in the internal combustion engine, the transport securing mechanism according to the invention can remain on the camshaft because—as mentioned above—the transport securing mechanism disintegrates or wears out during the run-in phase of the internal combustion engine at least to such an extent that it no longer impairs a release of the camshaft. The transport securing mechanism according to the invention can be formed, for example, from an oil-soluble and/or heat-sensitive material, for example plastic, so that it is able to reliably perform its securing tasks during the transport of the camshaft to the production site and is disintegrated by the oil present in the internal combustion engine during the operation or by the resulting heat so that the transport securing mechanism according to the invention is removed or reduced in the simplest possible way, that is, without further involvement, during the warm-up of the internal combustion engine to such an extent that it no longer affects in any way the camshaft or a bearing from being released.

It is in particular conceivable here that the oil-soluble and/or heat-sensitive transport securing mechanism is disintegrated or washed out during the warm-up of the internal combustion engine by the oil circulating therein, but, at the same time, does not negatively affect the lubricating properties of the oil. It is also conceivable that the at least one oil-soluble or heat-sensitive transport securing mechanism is disintegrated into particles which are small enough that they can remain in the disintegrated state in the oil without negative effects or can be separated at an oil filter device. Thus, with the transport securing mechanism according to the invention, assembling the camshaft in an internal combustion engine can be significantly simplified because the transport securing mechanism does not have to be removed in a costly manner as was previously the case.

In an advantageous development of the solution according to the invention, the at least one transport securing mechanism is produced using the screen printing method with in particular oil-soluble and/or heat-sensitive paint. In this case, the at least one transport securing mechanism can be formed as a ring-shaped or point-shaped bead printed onto an outer surface area of the camshaft, wherein producing the at least one transport securing mechanism using the screen printing method represents, on the one hand, an efficient and thus cost-effective production method and, on the other, a production method of extremely high quality.

In a further advantageous embodiment of the solution according to the invention, the at least one transport securing mechanism is configured as ring element glued or caulked onto the camshaft. Such a bonding of the at least one transport securing mechanism to the camshaft offers the great advantage that without the effect of heat and without the effect of a lubricating oil added only when operating the internal combustion engine, the transport securing mechanism has a solid state of aggregation, for example is formed as a ring which can easily be manually grasped, and therefore can be handled in an extremely simple manner during the assembly. The heat acting during warm-up of the internal combustion engine on the at least one transport securing mechanism or the chemical attack which then starts to act disintegrates the at least one transport securing mechanism or, respectively, reduces the wear resistance of the same significantly so that by mechanical influences, heat and/or chemical reactions, the securing effect of the at least one transport securing mechanism is eliminated thereby releasing the camshaft or a bearing.

Further important features and advantages of the invention arise from the sub-claims, from the drawings, and from the associated description of the figures based on the drawings.

It is to be understood that the above mentioned features and the features yet to be explained hereinafter can be used not only in the respectively mentioned combination but also in other combinations or alone without departing from the context of the present invention.

BRIEF DESCRIPTION OF THE DRAWING

Preferred exemplary embodiments of the invention are illustrated in the drawings and are explained in the following description in more detail, wherein identical reference numbers refer to identical, or similar, or functionally identical components.

In the figures, schematically.

DETAILED DESCRIPTION

According to FIGS. 1 to 4, a camshaft 1 has in each case at least one transport securing mechanism 2 according to the invention which, for example, is arranged in the region of a cam 3 (cf. FIGS. 1 and 2) and/or in the region of a bearing 4 supporting the camshaft 1. The transport securing mechanism 2 according to the invention, of which at least one is present per camshaft 1, serves for fixing, in particular axially fixing the bearing 4 relative to the camshaft 1. According to the invention, the at least one transport securing mechanism 2 is configured in such a manner that during the operation of the internal combustion engine in which the camshaft 1 is assembled, the transport securing mechanism creates a release by wearing out or by disintegrating. This can take place, for example, in that the at least one transport securing mechanism 2 is formed from an oil-soluble and/or heat-sensitive material, in particular from such a plastic. This offers the great advantage that during the transport of the camshaft 1 to the production site, that is, during an oil-free and comparatively cold state, the transport securing mechanism reliably assumes its securing tasks, whereas it loses said securing tasks under operating conditions, in particular during warm-up of the internal combustion engine, due to wear or disintegration.

According to the invention, the at least one transport securing mechanism 2 can be formed as ring element which is glued or caulked onto the camshaft 1. It is also conceivable that the at least one transport securing mechanism 2 is connected to the cam 3, in particular glued, or is formed as an axial collar of such a cam 3. Such a state is shown for example in FIG. 2. Of course, it is also conceivable that the at least one transport securing mechanism is connected to the bearing 4, in particular glued or injection molded thereon.

Figure 1:
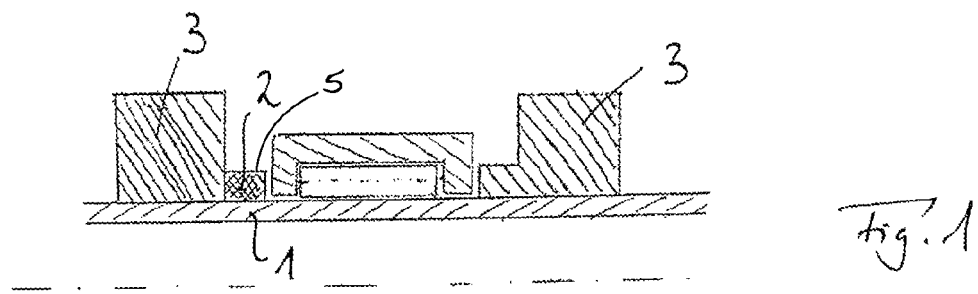
FIG. 1 shows a sectional view through a camshaft with a transport securing mechanism according to the invention which is formed as ring.
Figure 2:
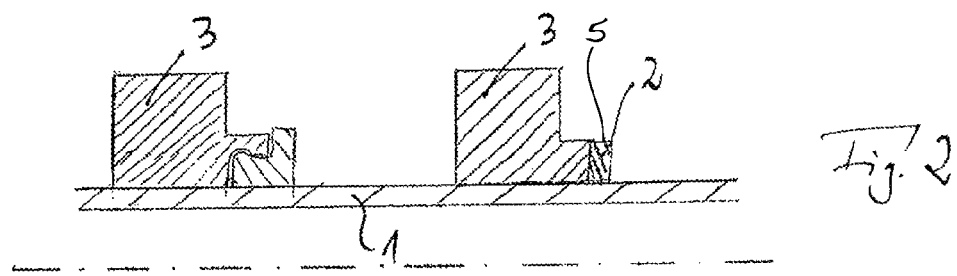
FIG. 2 shows an illustration as in FIG. 1 but with the ring-like transport securing mechanism being formed, in particular injection molded, on a collar of a cam.
Figure 3:
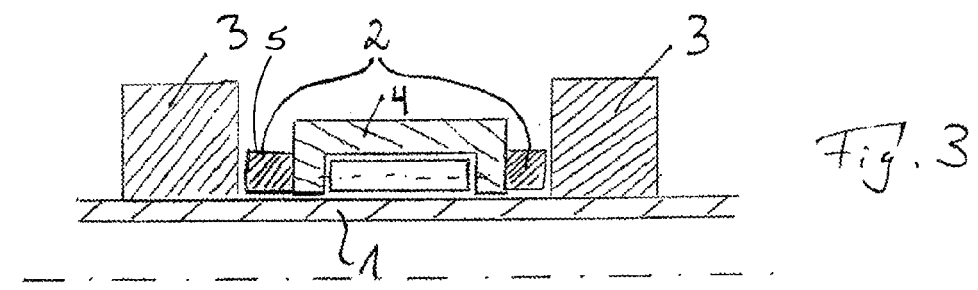
FIG. 3 shows two ring-like transport securing mechanisms in the region of a bearing of the camshaft.
Figure 4:
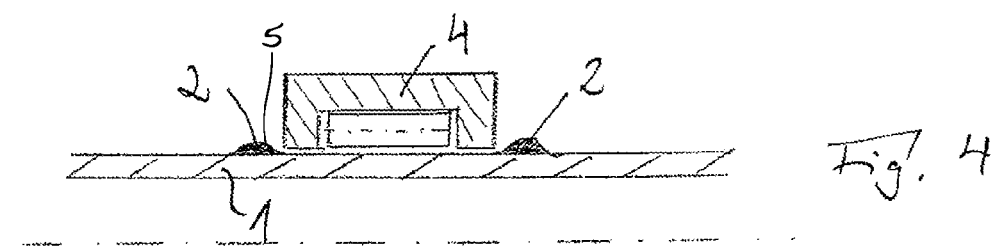
FIG. 4 shows two transport securing mechanisms each formed as annular bead.

Additionally or alternatively, the at least one transport securing mechanism 2 can also be formed as bead on the camshaft 1 as it is illustrated for example according to FIG. 4. In this case, the at least one transport securing mechanism 2 can be produced, for example, using the screen printing method with in particular oil-soluble and/or heat-sensitive paint. Such a transport securing mechanism 2 produced using the screen printing method can be applied, for example, on an outer surface area of the camshaft 1, on a bearing side surface of the bearing 4, on an inner bearing surface of the bearing 4 or on a side surface of a cam 3.

It is also conceivable that the transport securing mechanism 2 comprises an oil-soluble paper pulp and/or is configured as heat-sensitive adhesive via which the camshaft 1 is glued in particular to a bearing 4 of the camshaft 1.

All shown and described embodiments have the great advantage that the transport securing mechanism 2 can be produced in a simple and cost-effective manner and performs its securing tasks during the transport of the camshaft 1, for example to an assembly location in an internal combustion engine, in a reliable manner. Moreover, due to the specific material selection, the at least one transport securing mechanism 2 can remain even after assembling the camshaft 1 in the internal combustion engine on the camshaft and does not have to be removed in a costly manner as was previously the case. During the warm-up phase of the internal combustion engine, due to a chemical reaction with the now present lubricating oil, due to heat occurring during the operation of the internal combustion engine and/or due to mechanical stress, the at least one transport securing mechanism 2 now disintegrates or, respectively, wears out to an extent that the latter does no longer stand in the way of a freely movable mounting of the camshaft. Theoretically, it is also possible to use a rolling bearing grease for prepositioning.

The invention claimed is:

1. An internal combustion engine, comprising:
   a camshaft;
   at least one cam lobe configured on the camshaft;
   at least one bearing configured on the camshaft; and
   at least one transport securing mechanism, the transport securing mechanism axially fixing the at least one bearing, wherein the transport securing mechanism is one of released by wear and disintegration during operation of the internal combustion engine.

2. The camshaft according to claim 1, wherein the at least one transport securing mechanism is a ring element that is at least one of glued and caulked on the camshaft.

3. The camshaft according to claim 1, wherein the at least one transport securing mechanism is a bead on the camshaft.

4. The camshaft according to claim 1, wherein the at least one transport securing mechanism is glued to an axial collar of the cam lobe.

5. The camshaft according to claim 1, wherein the at least one transport securing mechanism is a plastic, wherein the plastic is at least one of an oil-soluble and heat-sensitive plastic, and wherein the plastic disintegrates during the operation of the internal combustion engine.

6. The camshaft according to claim 1, wherein the at least one transport securing mechanism is screen printed with at least one of an oil-soluble and a heat-sensitive paint.

7. The camshaft according to claim 6, wherein the screen printing is applied on one of an outer surface area of the camshaft, a bearing side surface of a bearing of the camshaft, an inner bearing surface of the bearing of the camshaft, and a side surface of the cam lobe.

8. The camshaft according to claim 1, wherein the at least one transport securing mechanism is an adhesive, and wherein the camshaft is glued to a bearing with the adhesive having at least one of an oil-soluble pulp and a heat-sensitive element.

* * * * *